United States Patent [19]

Quantz

[11] 3,857,001
[45] Dec. 24, 1974

[54] LOCK RELEASE WITH ALARM SWITCH MOUNTING MEANS

[75] Inventor: Norman G. Quantz, Algonac, Mich.

[73] Assignee: Lectron Products Inc., Troy, Mich.

[22] Filed: June 20, 1973

[21] Appl. No.: 371,719

[52] U.S. Cl. .............................. 200/61.64, 200/295
[51] Int. Cl. ............................................. H01h 9/02
[58] Field of Search..... 200/61.62–61.82, 294, 295, 200/296, 340; 174/53–58

[56] References Cited
UNITED STATES PATENTS

| | | | |
|---|---|---|---|
| 2,101,748 | 12/1937 | Michel et al................ | 200/61.81 X |
| 2,530,364 | 11/1950 | Woodward................... | 200/61.82 |
| 2,660,632 | 11/1953 | Makishima................... | 200/61.64 |
| 3,048,674 | 8/1962 | Hopkins....................... | 200/295 X |
| 3,119,909 | 1/1964 | Cutler........................... | 200/61.82 |
| 3,142,742 | 7/1964 | Kaleba et al................. | 200/295 X |
| 3,172,983 | 3/1965 | Zoda............................. | 200/295 |
| 3,211,850 | 10/1965 | Toepfer........................ | 200/61.64 |
| 3,394,909 | 7/1968 | DiPilla......................... | 174/54 X |
| 3,446,467 | 5/1969 | Bailey et al.................. | 174/57 X |
| 3,796,452 | 3/1974 | Foster et al.................. | 200/61.64 X |

*Primary Examiner*—James R. Scott
*Attorney, Agent, or Firm*—Harness, Dickey & Pierce

[57] ABSTRACT

A lock release has a latching element for releasably securing a hinged panel of an automotive vehicle and includes an opening formed in a housing portion which defines a seat for locatably receiving a switch of a security system. The switch is connected to the mechanism via a mounting clip which includes at least one end portion springingly engaged to a cooperatively formed edge of the opening. In response to pivotal movement of the latching element from a closed to an open position, the switch is adapted to inactivate the security system whereby the system is operative only in those instances indicative of a forced entry into the associated compartment closed by the panel.

4 Claims, 3 Drawing Figures

PATENTED DEC 24 1974  3,857,001
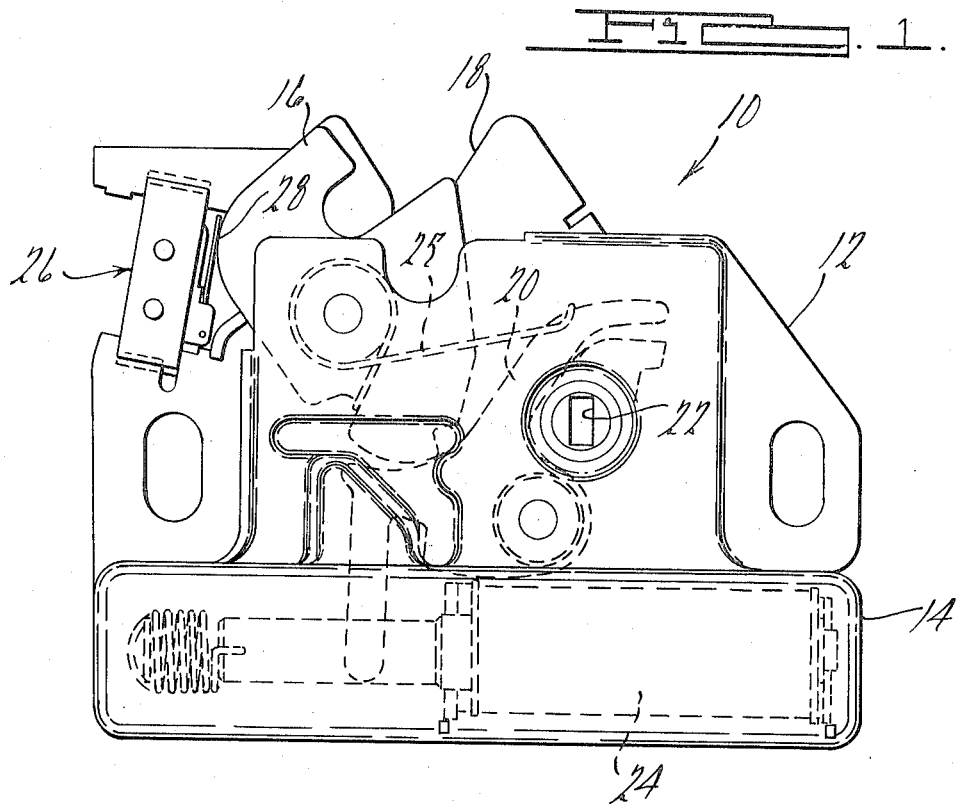
FIG. 1.
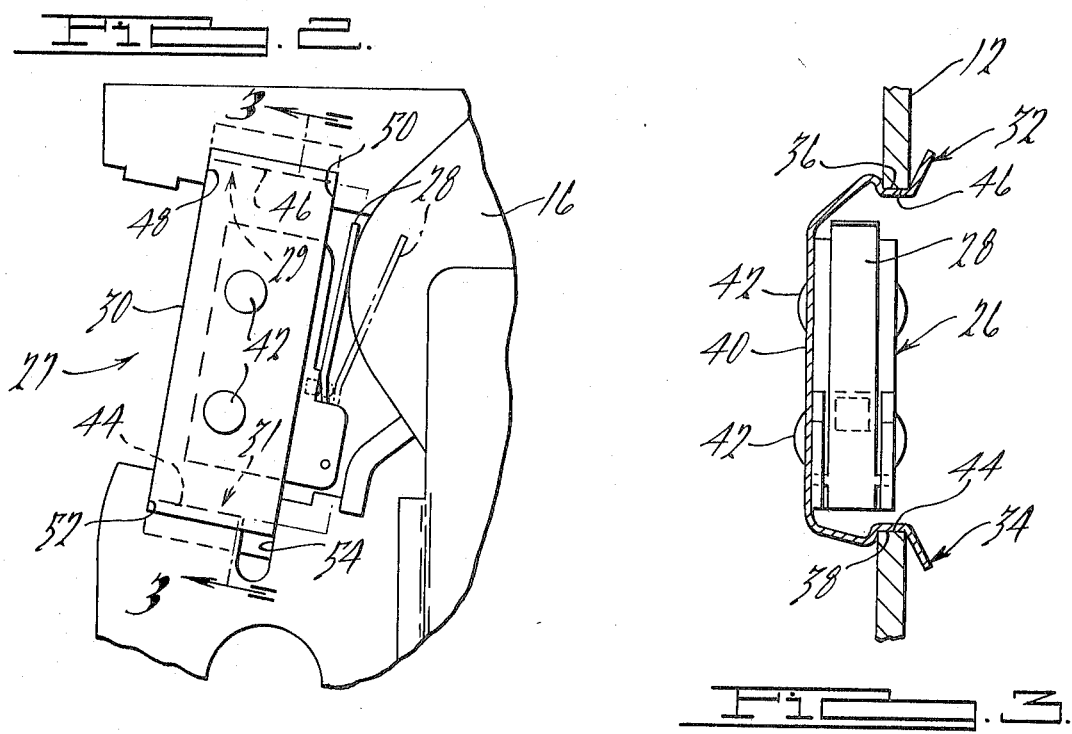
FIG. 2.
FIG. 3.

LOCK RELEASE WITH ALARM SWITCH MOUNTING MEANS

BACKGROUND AND SUMMARY OF THE INVENTION

The subject invention pertains generally to lock release mechanisms and more particularly to mechanisms of the above character adapted for releasably securing hinged panels to adjacent body portions of automotive vehicles provided with a security system.

In providing a security system for detecting a forced opening of hinged panels such as a trunk or deck lid of an automotive vehicle, a switch is provided to inactivate the system when the lid is opened in response to proper actuation of the lock release. The switch is conventionally mounted on the base plate of the lock release proximate a pivotably supported latch. In response to movement of the latch from a closed to an open position, the switch can be actuated from a normally conductive to a non-conductive position to inactivate the security system. Since a security or alarm system is an option on most vehicles, heretofore various types of auxiliary locators, fasteners and/or brackets have been utilized in assembling the switch in a proper actuable location on the mechanism relative to the latch. In some instances, the assembly of the switch necessitated the complete removal of the lock release assembly from the vehicle while in other instances, an associated cover plate of the mechanism had to be removed. In the present invention, a standard lock release is adapted to cooperatively receive and locate the switch which is subject to facilitate the installation thereof during final assembly. It is, therefore, a general object of the present invention to provide standard type lock releases of the above indicated character which will permit the installation of the switch during final assembly and which will obviate any requirement of auxiliary locators, fasteners, brackets, or the like.

In another aspect of the present invention, when the switch is mounted to the lock release by the use of threaded fasteners, tapped holes for receiving the fasteners must be accurately placed on the lock release to properly locate the switch relative to the latch. Since the housing is conventionally fabricated from stamped parts, the placement of tapped openings can comprise an additional manufacturing step. In the present invention, a latch frame plate is provided with an opening properly located relative to the latch which can be formed during the stamping operation. The switch on the other hand is provided with a spring like clip which is adapted to be snapped into place within the opening whereby the switch is actuable in response to pivotal movement of the latch. It is, therefore, another object of the subject invention to provide a standard lock release of the above indicated character wherein a security system switch can be expediently assembled in a proper and precise location relative to the latch, and the means for receiving the switch can be formed from a basic stamping operation.

Other objects, features and advantages of the present invention will become apparent from the subsequent description and the appended claims, taken on conjunction with the accompanying drawings.

BRIEF DESCRIPTION OF THE DRAWINGS

FIG. 1 is a plan view of an exemplary lock release including an alarm switch mounting means in accordance with a preferred embodiment of the present invention;

FIG. 2 is an enlarged fragmentary view of an upper left hand portion of the lock release illustrated in FIG. 1; and FIG. 3 is a fragmentary cross-sectional elevation of the lock release and switch illustrated in FIG. 2 taken on the lines 3-3 thereof.

DETAILED DESCRIPTION OF THE PREFERRED EMBODIMENT

With reference to FIG. 1 of the drawings, an exemplary lock release in accordance with a preferred embodiment of the present invention is indicated generally at 10. The release 10 includes an outer housing formed by a lower base plate 12 and an upper cover plate 14 which are preferably formed by a stamping operation. The housing is adapted to be fixedly connected to either a hinged panel or an associated body portion of the vehicle and support an actuating mechanism for connecting the panel to the body portion as shall hereinafter be described in detail. For convenience of description, it will be noted that terms such as "right," "left," "upper," "lower," "front," "rear" and words of similar import will have reference to the lock release 10 of the present invention as it is illustrated in FIGS. 1 and 2 of the drawings and described hereinafter in detail. Likewise, terms such as "inner," "outer" and derivatives thereof will have reference to the geometric center of the lock release 10 and the various component parts thereof.

The actuating mechanism is located between the base and cover plates 12 and 14 and comprises a latch element 16 pivotably supported in operative relationship proximate a bolt receiving passage 18, and a detent member 20 which is adapted to release the latch element 18. The lock release 10 is of the type which may be actuated via a locking cylinder 22 or by energization of a solenoid 24 from a remote location such as the dash board of the vehicle. In response to either of the above indicated operating means, the latch 16 is adapted to pivot in a counterclockwise direction under the bias of a torsion spring 25 to open the hinged panel. The precise details of the operation and construction of the lock release 10 form no part of the subject invention, and for a complete description of the precise details, reference can be had to co-pending U.S. Pat. application, Ser. No. 256,990, filed May 25, 1972 now abandoned which is assigned to the assignee of the present invention.

The lock release 10 is provided as a standard unit and is adapted to be installed on all vehicles during the assembly operation regardless of whether a security system is to be provided or not. On such vehicles to be equipped with a security system however, the lock release 10 is adapted to facilitate the reception of a suitable micro switch 26 or the like, the switch 26 coacting with the actuating mechanism to inactivate the security system in response to counterclockwise movement of the latch 16 from a closed to an open position. As will hereinafter become apparent, the switch 26 can be operatively assembled on the lock release 10 without necessitating removal thereof, nor removal of the cover plate 14. Moreover, the switch 26 does not require the employment of auxiliary fastener means such as bolts, screws, or the like.

With reference to FIG. 2, an opening 27 is formed in the base plate 12 to the left of the latch element 16 which cooperatively defines a seat for the switch 26. More particularly the opening 27 comprises a first generally rectangularly shaped slot 29 formed by a laterally extending edge 46 and first and second spaced, longitudinally extending, parallel edges 48, 50 which define locating shoulders for the switch 26. Correspondingly, on the opposite side of the opening 27, a second rectangularly shaped slot 31 is formed. The second slot 31 is comprised of a laterally extending edge 44 and spaced, longitudinally extending, parallel edges 52, 54, the latter being in aligned registration with the edges 48 and 50 respectively. In the present invention the laterally extending edges 44 and 46 are adapted to cooperate in engageably receiving the switch 26 while the longitudinally extending edges 48, 50, 52 and 54 define shoulders for precisely, operatively locating the switch 26 relative to the latch 16.

The switch 26 is connected to the base plate 12 via a mounting clip fastening member indicated generally at 30. The member 30 includes a longitudinally extending, generally flat base portion 40 which is co-extensive with an upper surface of the switch 26 and is connected thereto by suitable rivets, screws, or the like 42. Opposite end portions 32 and 34 of the member 30 are folded obliquely relative to the plane of the base portion 40 and include substantially rectangular shaped seating portions 36 and 38 which are formed to cooperatively receive the edges 44 and 46. The outer marginal edges of the end portions 32 and 34 are folded obliquely relative to the surface of the base plate 12 whereby to facilitate the seating of the member 30 within the confines of the first and second rectangularly shaped openings 29 and 31.

The switch is normally closed and opened in response to pivotal movement of an actuating arm 28 to inactivate the circuit of the security system. In this regard, the arm 28 is pivoted from a position illustrated in phantom in FIG. 2 to an inward position relative to the switch 26 in response to pivotal movement of the latch 16 from a position adapted for securing the hinged panel to a second position adapted for releasing the panel. Thus, in response to normal opening of the deck lid by energizing the solenoid 24 or, by manual operation of the locking cylinder 22, the security system is inactivated. If, however, the hinged panel is forced open, some portion of the latch 16 usually breaks away so that the latch does not move to the released position as the deck lid opens and, consequently, it does not permit the arm 28 to move to the inward position (FIG. 2) to disarm the security system. This, of course, results in the continued activation of the security system and consequently the alarm thereof.

The standard lock release of the subject invention can also be utilized in security systems indicative of the hinged panel not being fully closed. By providing a switch which is normally conductive in the phantom position (FIG. 2) and non-conductive in the closed position, the position of the latch and correspondingly the hinged panel can be monitored. In this regard the switch can activate an audible or visual indicating device to appraise the operator of the prevailing condition.

It, therefore, will be noted that a standard lock release has been provided which is adapted for cooperative reception of a switch for a security system by the expedient of forming a seat thereof during the stamping operation of the base plate 12. It will also be noted that the switch is subject to be accurately located in proper relationship to co-act with the movement of the latch whereby the actuating arm 28 of the switch 26 is accurately controlled. Moreover, an additional advantage will be seen to reside in the installation of the switch assembly itself in that it is subject to be simply springingly snapped into place obviating auxiliary fasteners and accordingly decreasing the production time of installation.

While it will be apparent that the preferred embodiment of the invention herein disclosed is well calculated to fulfill the objects above stated, it will be appreciated that the invention is susceptible to modification, variation and change without departing from the proper scope and fair meaning of the subjoined claims.

I claim:

1. A locking mechanism for releasably securing a hinged member to an associated frame, said mechanism including movable latch means having securing and releasing positions and housing means attachable to one of said hinged member and said frame for operatively supporting said latch means in combination with a security system for detecting a forced opening of said hinged member including switch means for inactivating said system in response to movement of said latch means from said securing to said releasing position, said housing means including locator means comprising a cut-out portion having a pair of oppositely spaced parallel edges for operatively positioning said switch in an actuatable position relative to said latch means;

and cooperative interlocking means including a clip having at least one end portion compressively engaged to one of said edges associated with said switch and said locator means for immovably retaining said switch in said operative position.

2. The improvement as recited in claim 1 wherein said locator means includes shoulder means extending traversely relative to said edges for operatively locating said switch relative to said latch means.

3. A latch mechanism including a movable element for releasably securing a hinged member such as the deck lid of an automotive vehicle and adapted to be selectively operatively combined with a security system for detecting when said hinged member is forced or otherwise open, said security system being of a type including a control switch having an operating arm movable between system-energizing and system-deenergizing positions in response to movement of said movable element from a retaining to releasing position, said latch mechanism having a housing adapted to be fixedly mounted on said vehicle in operative association with said hinged member and said element being operatively carried by said housing, said housing having a portion thereof disposed adjacent to said movable element which is exposed and readily accessible for mounting said control switch when said latch mechanism is mounted on said vehicle, the mentioned portion of said housing being provided with means for accepting said control switch and said means having locating edge portions, said control switch being attached to and carried by a mounting clip having flexible and resilient snap-fastening means, said control switch adapted to be selectively assembled with said latch mechanism and in the process to be pushed into engagement with said switch accepting means from outside said housing and said snap-fastening means being adapted at assembly to interengage with said locating edge portions as said switch is accepted fully be said switch accepting means.

4. A latch mechanism for releasably securing a hinged member such as a deck lid, of an automotive vehicle, said latch mechanism including a housing and a movable element carried thereby, said housing adapted to be mounted on said vehicle with said element disposed for movement between a hinged member retaining position and a hinged member releasing position, said latch mechanism adapted, for the purpose of detecting when said hinged member is forced or otherwise improperly opened, to be selectively combined with a security system including a control switch of a type having an operating arm movable between system energizing and system de-energizing positions and carried by mounting clip means having flexible and resilient snap fastening means, said housing having a portion thereof disposed adjacent to said movable element and said portion provided with means having locating edge portions for accepting said control switch, the mentioned portion of said housing being exposed and readily accessible for mounting said control switch in a manner permitting the latter to be pushed into engagement with said switch accepting means from outside said housing with said snap fastening means interengaged with said locating edge portions, and said locating edge portions being disposed with respect to said movable element to position the operating arm of said control switch for actuation by said element as the latter moves between said retaining and releasing positions.

* * * * *